United States Patent [19]
Freedman

[11] 3,859,306
[45] Jan. 7, 1975

[54] BENZOXEPINE DERIVATIVES

[76] Inventor: Jules Freedman, 419 Susan Ln., Thiensville, Wis. 53092

[22] Filed: Mar. 8, 1973

[21] Appl. No.: 339,058

[52] U.S. Cl............... 260/333, 424/278, 260/343.2, 260/619 D, 260/295 F, 260/297 S, 260/332.2 H, 260/332.3 P

[51] Int. Cl............................................. C07d 9/00

[58] Field of Search..................................... 260/333

Primary Examiner—Norma S. Milestone
Attorney, Agent, or Firm—T. F. Kryshak

[57] ABSTRACT

The compounds are benzoxepines which are central nervous system depressants. A compound disclosed is 6,7,8,9,10,11-hexahydro-6,6-dimethyldibenz[b,d]oxepin-3-ol.

5 Claims, No Drawings

BENZOXEPINE DERIVATIVES

BACKGROUND OF THE INVENTION

The compound 2,3-dihydro-7,9-dimethyl-1-benzoxepin-2-one-5-carboxylic acid was disclosed by R. V. Smith and M. D. Bealor in J. Org. Chem., 27, 3092 (1962).

DETAILED DESCRIPTION

The compounds of the present invention have the following formula:

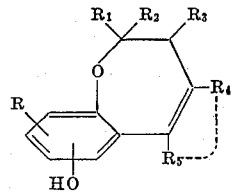

in which R is hydrogen or a straight chain or branched alkyl of one to nine carbon atoms such as methyl, ethyl, isopropyl or butyl, $R_1$ and $R_2$ are the same or different and may be hydrogen or a lower alkyl of one to four carbon atoms, $R_3$ is hydrogen, a lower alkyl of one to four carbon atoms or phenyl, and $R_4$ and $R_5$ are the same or different and may be hydrogen, a lower alkyl of one to four carbon atoms, an aryl such as phenyl or a nuclear substituted phenyl such as dimethyl, a halophenyl such as dichlorophenyl, trifluoromethylphenyl, a heterocyclic such as nicitinoyl or thenoyl, or $R_4$ and $R_5$ may be joined together by an alkylidene chain to form a cycloalkyl such as cyclohexyl or methylcyclohexyl.

The compounds of the present invention may be conveniently prepared by the reaction of a phenol such as resorcinol with a γ-keto acid or ester such as ethyl 2-oxo-4-methylcyclohexaneacetate in the presence of a condensing agent such as polyphosphoric acid, boron trifuloride or phosphorous chloride. The resulting lactone is then treated with a Grignard reagent to form the corresponding alcohol. The alcohol is then treated with an acidic catalyst such as hydrobromic acid or boron trifluoride etherate to give the desired benzoxepin.

The process may be illustrated as follows:

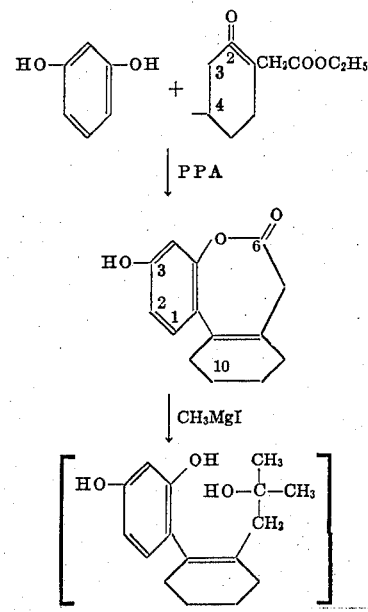

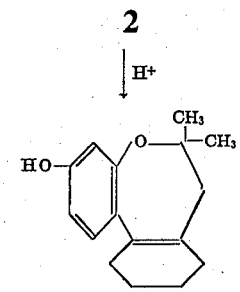

The process by which the lactones are prepared is a modification of the well-known Pechmann reaction which is described in the literature (Organic Reactions, Vol. 7. page 1, 1953).

Representative of the phenols which may be employed in the reactions are the following:
resorcinol,
orcinol,
5-n-hexylresorcinol,
olivetol, and
5-(1,2-dimethylheptylresorcinol).

Representative of the δ-keto acids and esters which may be employed are the following:
4-methyl-2-oxocyclohexaneacetic acid,
3-benzoylpropionic acid,
3-(3,4-dichlorobenzoyl)-propionic acid,
2-oxocyclohexaneacetic acid,
3-(3-nicitinoyl)propionic acid,
3-(2-thenoyl)propionic acid,
3-(4-fluorobenzoyl) propionic acid,
3-(4-methoxybenzoyl)propionic acid,
3-benzoylbutyric acid,
2-methyl-2-benzoylbutyric acid,
2-phenyl-3-benzoylbutyric acid,
ethyl-2-oxocyclohexaneacetate, and
ethyl-2-oxo-4-methylcyclohexaneacetate.

Representative of the benzoxepinones which may be prepared by the described process are the following:
8,9,10,11-tetrahydro-3-hydroxydibenz[b,d]oxepin-6(7H)one,
8,9,10,11-tetrahydro-3-hydroxy-10-methyldibenz[b,d]oxepin-6(7H)one,
8,9,10,11-tetrahydro-3,10-dimethyl-1-hydroxydibenz[b,d]oxepin-6(7H)one,
8,9,10,11-tetrahydro-1-hydroxy-10-methyl-3-n-pentyldibenz[b,d]oxepin-6(7H)one,
3-(1,2-dimethylheptyl)-8,9,10,11-tetrahydro-1-hydroxy-10-methyldibenz[b,d]oxepin-6(7H)one,
3-n-hexyl-8,9,10,11-tetrahydro-1-hydroxy-10-methyldibenz[b,d]oxepin-6(7H)one,
3-n-pentyl-8,9,10,11-tetrahydro-1-hydroxy-10-methyldibenz[b,d]oxepin-6(7H)one,
5-phenyl-2,3-dihydro-8-hydroxy-1-benzoxepin-2-one,
5-(3,4-dichlorophenyl)-2,3-dihydro-8-hydroxy-1-benzoxepin-2-one,
5-(3-nicitinoyl)-2,3-dihydro-8-hydroxy-1-benzoxepin-2-one,
5-(3-thenoyl)-2,3-dihydro-8-hydroxy-1-benzoxepin-2-one,
5-(4-fluorophenyl)-2,3-dihydro-8-hydroxy-1-benzoxepin-2-one,
5-(4-methoxyphenyl)-2,3-dihydro-8-hydroxy-1-benzoxepin-2-one,
5-phenyl-2,3-dihydro-8-hydroxy-6-methyl-1-benzoxepin-2-one,
5-phenyl-8-methyl-6-hydroxy-2,3-dihydro-1-benzoxepin-2-one, 5-(3-nicitinoyl)-8-n-hexyl-6-hydroxy-2,3-dihydro-1-benzoxepin-2-one, 5-(3-thenoyl)-8-n-hexyl-6-hydroxy-2,3-dihydro-1-benzoxepin-2-one, 5-(4-fluorophenyl)-8-n-hexyl-6-hydroxy-2,3-dihydro-1-benzoxepin-2-one, 5-(4-methoxyphenyl)-8-n-hexyl-6-hydroxy-2,3-dihydro-1-benzoxepin-2-one, 5-phenyl-3-methyl-8-n-hexyl-6-hydroxy-2,3-dihydro-1-benzoxepin-2-one, and 3,5-diphenyl-8-n-hexyl-6-hydroxy-2,3-dihydro-1-benzoxepin-2-one.

The benzoxepinones thus obtained are useful as intermediates in the preparation of the corresponding benzoxepines which are central nervous system depressants.

Representative of the benzoxepines which may be obtained by the described process are the following:

6,7,8,9,10,11-hexahydro-6,6-dimethyldibenz[b,d]-oxepin-3-ol, 6,7,8,9,10,11-hexahydro-6,6,10-trimethyldibenz-[b,d]oxepin-3-ol, 6,7,8,9,10,11-hexahydro-3,6,6,10-tetramethyldibenz[b,d]oxepin-1-ol, 6,7,8,9,10,11-hexahydro-6,6,10-trimethyl-3-n-pentyldibenz[b,d]oxepin-1-ol, 5-phenyl-2,3-dihydro-2,2-dimethyl-1-benzoxepin-8-ol, 5-(3,4-dichlorophenyl)-2,3-dihydro-2,2-dimethyl-1-benzoxepin-8-ol, 5-(3-thenoyl)-2,3-dihydro-2,2-dimethyl-1-benzoxepin-8-ol, 5-(4-fluorophenyl)-2,3-dihydro-2,2-dimethyl-1-benzoxepin-8-ol, 5-phenyl-8-n-pentyl-2,3-dihydro-2,2-dimethyl-1-benzoxepin-6-ol, 5-phenyl-8-n-hyxyl-2,3-dihydro-2,2-dimethyl-1-benzoxepin-6-ol, 5-(4-fluorophenyl)-8-n-hexyl-2,3-dihydro-2,2-dimethyl-1-benzoxepin-6-ol, 5-(3-thenoyl)-8-n-hexyl-2,3-dihydro-2,2-dimethyl-1-benzoxepin-6-ol, 5-(4-methoxyphenyl)-8-n-hexyl-2,3-dihydro-2,2-dimethyl-1-benzoxepin-6-ol, 5-phenyl-2,3-dihydro-2,2,8-trimethyl-1-benzoxepin-6-ol, and 5-phenyl-8-n-hexyl-2,3-dihydro-2,2,3-trimethyl-1-benzoxepin-6-ol.

The novel compounds of the invention have been found to elicit a central nervous system depressant effect in animals. For example, the compound 6,7,8,9,10,11-hexahydro-6,6-dimethyldibenz[b,d]oxepin-3-ol has produced in mice in behavioral screening tests a behavioral profile typical of that produced by mild central nervous system depressants of the tranquilizer type. In mice receiving 100 mg/kg of the compound intraperitoneally as a 5 percent aqueous suspension, a central nervous system depressant effect was demonstrated. As an added result of the behavioral testing, the compound was found to have an $LD_{50}$ of more than 1000 mg/kg. The behavioral studies were conducted in accordance with the procedures set forth by Irwin in "Animal and Clinical Pharmacologic Techniques in Drug Evaluation", J. H. Nodine and P. E. Siegler, Ed., Year Book Publishers, Inc. (1964), pp. 36–54.

When used as pharmaceutical agents, it is preferred to combine the compounds with conventional pharmaceutical additives, such as diluents, flavoring agents, disintegrating agents, and to form them into conventional unit dosage forms, such as tablets or capsules for oral use, or sterile liquids for parenteral administration.

The unit dosage forms such as tablets or capsules will generally contain a concentration of 0.1 percent to 10 percent by weight of one or more of the active ingredients. While the exact daily dose of the active ingredient will depend upon many factors, including the severity of the patient's condition and the other medication being administered, it will generally range from 10 to 250 mg. per day.

The following examples are presented to illustrate the practice of this invention:

EXAMPLE 1

8,9,10,11-Tetrahydro-3-hydroxydibenz[b,d]oxepin-6(7H)one

A mixture of 26.7 g. (0.145 mole) of ethyl 2-oxocyclohexaneacetate, 16.5 g. (0.15 mole) of resorcinol, and 75 g. of polyphosphoric acid is stirred for 2 hours. When the exothermic reaction ceases, the mixture is poured into 150 ml. of water and stirred until the polyphosphoric acid decomposes. The product is extracted into ether and the extracts dried over magnesium sulfate. The ether is removed and the residue dissolved in 100 ml. of toluene. Cooling gives the 8,9,10,11-tetrahydro-3-hydroxydibenz[b,d]oxepin-6-(7H)one, m.p. 170°–175°. Two recrystallizations from ethyl acetate give an analytical sample, m.p. 183°–184°.

Anal. Calcd. for $C_{11}H_{14}O_3$: C, 73.02; H, 6.13.
Found: C, 72.72; H, 5.94.

EXAMPLE 2

8,9,10,11-Tetrahydro-3-hydroxy-10-methyldibenz[b,d]oxepin-6(7H)one

A mixture of 34.2 g. (0.172 mole) of ethyl 2-oxo-4-methylcyclohexaneacetate, 18.8 g. (0.172 mole) of resorcinol, and 107 g. of polyphosphoric acid is heated on a steambath for one hour, cooled, and poured into 150 ml. of ice water. When the polyphosphoric acid decomposes, the product is extracted into chloroform and the extracts dried over magnesium sulfate. The product (4.1 g., m.p. 140–145°) is isolated by chromatography on silica gel and elution with chloroform. Recrystallization from methylcyclohexane gives 8,9,10,11-tetrahydro-3-hydroxy-10-methyldibenz[b,d]oxepin-6-(7H)one, m.p. 144°–146°.

Anal. Calcd. for $C_{15}H_{16}O_3$: C, 73.75; H, 6.60.
Found: C, 73.83; H, 6.61.

EXAMPLE 3

8,9,10,11-Tetrahydro-3,10-dimethyl-1-hydroxydibenz[b,d]oxepin-6(7H)one

A mixture of 17.0 g. (0.1 mole) of 4-methyl-2-oxocyclohexaneacetic acid, 14.2 g. (0.1 mole) of orcinol monohydrate, 12 ml. (0.132 mole) of phosphorous oxychloride, and 200 ml. of benzene is heated to reflux for 2 hours, cooled in ice, and treated with 100 ml. of water. The benzene layer is separated, washed with sodium bicarbonate solution and dried with magnesium sulfate. The lactone 8,9,10,11-tetrahydro-3,10-dimethyl-1-hydroxydibenz[b,d]oxepin-6(7H)one is recrystallized twice from fifteen volumes of nitromethane, m.p. 194°–196°.

Anal. Calcd. for $C_{16}H_{18}O_3$: C, 74.39; H, 7.02.
Found: C, 74.72; H, 7.11.

EXAMPLE 4

8,9,10,11-Tetrahydro-1-hydroxy-10-methyl-3-n-pentyldibenz[b,d]oxepin-6(7H)one

A mixture of 7.1 g. (0.04 mole) of 4-methyl-2-oxocyclohexaneacetic acid, 6.8 g. (0.04 mole) of olivetol, 4.8 ml. (0.052 mole) of phosphorous oxychloride, and 80 ml. of benzene is refluxed for two hours, cooled, and 40 ml. of water added. The benzene layer is separated and washed with sodium bicarbonate solution. The solvent is removed and the lactone isolated by chromatography on silica gel and elution with a mixture of equal parts of toluene and chloroform. The lactone (3.8 g., m.p. 81°–82°) is recrystallized from nitromethane to give an analytical sample of 8.9,10,11-tetrahydro-1-hydroxy-10-methyl-3-n-pentyldibenz[b,d]oxepin-6(7H)one, m.p. 89°–91°.

Anal. Calcd. for $C_{20}H_{26}O_3$: C, 76.40; H, 8.34.
Found: C, 76.74; H, 8.34.

EXAMPLE 5

2,3-Dihydro-8-hydroxy-5-phenyl-1-benzoxepin-2-one

A mixture of 10.01 g. (0.1 mole) of resorcinol, 17.81 g. (0.1 mole) of 3-benzoylpropionic acid, 10 ml. (0.11 mole) of $POCl_3$, and 100 ml. of benzene is refluxed for 3 hours and stirred at room temperature overnight. The mixture is then cooled in ice and 50 ml. of water added dropwise. The solids which precipitate are filtered and treated with ether. Insoluble solids are filtered and the filtrate extracted with $NaHCO_3$ solution and dried over $MgSO_4$. Removal of the solvent gives 2,3-dihydro-8-hydroxy-5-phenyl-1-benzoxepin-2-one, m.p. 148°–150°.

Anal. Calcd. for $C_{16}H_{12}O_3$: C, 76.16; H, 4.80.
Found: C, 75.89; H, 4.80.

EXAMPLE 6

5-(3,4-Dichlorophenyl)-2,3-dihydro-8-hydroxy-1-benzoxepin-2-one

A mixture of 24.7 g. (0.1 mole) of 3-(3,4-dichlorobenzoyl)propionic acid, 11.0 g. (0.1 mole) of resorcinol, 10 ml. (0.11 mole) of phosphorous oxychloride, and 100 ml. of benzene is refluxed for 3 hours, cooled, and treated with 100 ml. of water. The benzene layer is separated and washed with sodium bicarbonate solution. Removal of the benzene and recrystallization of the residue from nitromethane gives 5-(3,4-dichlorophenyl)-2,3-dihydro-8-hydroxy-1-benzoxepin-2-one, m.p. 198°–201°.

Anal. Calcd. for $C_{16}H_{10}Cl_2O_3$: C, 59,83; H, 3.14; Cl, 22.08.
Found: C, 59.90; H, 3.27; Cl, 22.23.

EXAMPLE 7

6,7,8,9,10,11-Hexahydro-6,6-di-methyldibenz[b,d]oxepin-3-ol 8,9,10,11-Tetrahydro-3-hydroxydibenz[b,d]oxepin-6(7H)one (6.5 g., 0.028 mole) is added to the Grignard reagent prepared from 41 g. (0.29 mole) of methyl iodide, 6.5 g. (0.27 mole) of magnesium turnings, and 85 ml. of ether. After addition of 70 ml. of dry benzene, the mixture is refluxed for 12 hours, cooled, and treated with 100 ml. of saturated ammonium chloride. The resultant product is shaken with 300 ml. of water and 300 ml. of ether and the organic layer separated and dried. The solvents are removed and the residue refluxed for 15 minutes with 140 ml. of heptane and 10 drops of 48 percent hydrobromic acid. The solvent is decanted and the residue purified by chromatography on silica. Elution with chloroform gives 6,7,8,9,10,11-hexahydro-6,6-dimethyldibenz[b,d]oxepin-3-ol, m.p. 187°–188°, unchanged or recrystallization from tomuene.

Anal. Calcd. for $C_{16}H_{20}O_2$: C, 78.64; H, 8.25.
Found: C, 78.89; H, 8.46.

EXAMPLE 8

6,7,8,9,10,11-Hexahydro-6,6,10-trimethyldibenz[b,d]oxepin-3-ol 8,9,10,11-Tetrahydro-3-hydroxy-10-methyl-dibenz[b,d]-oxepin-6(7H)one (6.5 g., 0.0265 mole) is added to the Grignard reagent prepared from 40 g. (0.28 mole) of methyl iodide, 6.55 g. (0.265 mole) of magnesium turnings, and 70 ml. of anhydrous ether. After addition of 70 ml. of dry benzene, the mixture is refluxed for 12 hours. Workup, described in Example 7, gives the oxepin 6,7,8,9,10,11-hexahydro-6,6,10-trimethyldibenz[b,d]oxepin-3-ol, m.p. 183°–185°, unchanged on recrystallization from benzene.

Anal. Calcd. for $C_{17}H_{22}O_2$: C, 79.04; H, 8.59.
Found: C, 78.04; H, 8.10.

EXAMPLE 9

6,7,8,9,10,11-Hexahydro-3,6,6,10-tetramethyldibenz[b,d]oxepin-1-ol 8,9,10,11-Tetrahydro-3,10-dimethyl-1-hydroxydibenz[b,d]-oxepin-6(7H)one (7.6 g., 0.0295 mole) is added to the Grignard reagent prepared from 63.7 g. (0.45 mole) of methyl iodide, 10.7 g. (0.432 mole) of magnesium turnings, and 90 ml. of ether. After addition of 100 ml. of benzene, the mixture is refluxed for 3 hours. Excess saturated ammonium chloride solution is added and the organic layer separated and dried. The crude alcohol is purified by chromatography on silica. It is then dissolved in 100 ml. of methylene chloride containing 1.0 ml. of boron trifluoride etherate. After 1.5 hours at room temperature, the solution is shaken with 20 ml. of cold water and washed with sodium bicarbonate solution. After drying with magnesium sulfate, the solvent is removed and the residue recrystallized twice from nitromethane to give 6,7,8,9,10,11-hexahydro-3,6,6,10-tetramethyldibenz[b,d]-oxepin-1-ol, m.p. 164°–165°.

Anal. Calcd. for $C_{18}H_{24}O_2$: C, 79.39; H, 8.88.
Found: C, 78.94; H, 8.86.

EXAMPLE 10

6,7,8,9,10,11-Hexahydro-6,6,10-trimethyl-3-n-pentyldibenz[b,d]oxepin-1-ol 8,9,10,11-Tetrahydro-1-hydroxy-10-methyl-3-n-pentyl-dibenz[b,d]oxepin-6(7H) one (8.04 g., 0.026 mole) is added to the Grignard reagent prepared from 59.5 g. (0.42 mole) of methyl iodide, 10.3 g. (0.42 mole) of magnesium, and 100 ml. of ether. After addition of 100 ml. of dry benzene, the mixture is refluxed for 5 hours. Workup as described in Example 9 gives the dibenzoxepin 6,7,8,9,10,11-hexahydro-6,6,10-trimethyl-3-n-pentyldibenz[b,d]oxepin-1-ol, m.p. 114°–116°.

Anal. Calcd. for $C_{22}H_{32}O_2$: C, 80.43; H, 9.82.
Found: C, 79.92; H, 9.90.

I claim:

1. A compound of the formula

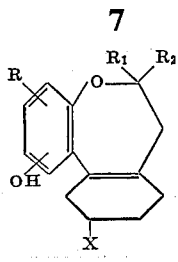

in which R is hydrogen or a straight chain or branched alkyl of one to nine carbon atoms, $R_1$ and $R_2$ are methyl and X is hydrogen or a lower alkyl of one to four carbon atoms.

2. The compound of claim 1 which is 6,7,8,9,10,11-hexahydro-6,6,10-trimethyldibenz[b,d]oxepin-3-ol.

3. The compound of claim 1 which is 6,7,8,9,10,11-hexahydro-6,6,-dimethyldibenz[b,d]oxepin-3-ol.

4. The compound of claim 1 which is 6,7,8,9,10,11-hexahydro-3,6,6,10-tetramethyldibenz[b,d]oxepin-1-ol.

5. The compound of claim 1 which is 6,7,8,9,10,11-hexahydro-6,6,10-trimethyl-3-n-pentyldibenz[b,d]oxepin-1-ol.

* * * * *